US006867588B1

(12) United States Patent
Hannah

(10) Patent No.: US 6,867,588 B1
(45) Date of Patent: Mar. 15, 2005

(54) NUCLEAR SPIN RESONANCE CLOCK ARRANGEMENTS

(75) Inventor: Eric C. Hannah, Pebble Beach, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/742,816

(22) Filed: Dec. 23, 2003

(51) Int. Cl.[7] .................................................. G01V 3/00
(52) U.S. Cl. ....................................................... 324/300
(58) Field of Search ................................. 324/300, 322

(56) References Cited

U.S. PATENT DOCUMENTS

| | | | | |
|---|---|---|---|---|
| 5,166,620 A | * | 11/1992 | Panosh | 324/322 |
| 5,296,802 A | * | 3/1994 | Beranger et al. | 324/117 R |
| 6,585,660 B2 | * | 7/2003 | Dorando et al. | 600/486 |
| 6,681,135 B1 | * | 1/2004 | Davis et al. | 607/21 |
| 6,710,663 B1 | * | 3/2004 | Berquist | 331/3 |

* cited by examiner

*Primary Examiner*—Brij B. Shrivastav
(74) *Attorney, Agent, or Firm*—Blakely, Sokoloff, Taylor & Zafman LLP

(57) ABSTRACT

Nuclear spin resonance (NSR) clock arrangements.

24 Claims, 3 Drawing Sheets

NUCLEAR SPIN RESONANCE CLOCK ARRANGEMENTS

FIELD

The present disclosure relates to nuclear spin resonance (NSR) clock arrangements.

BACKGROUND

Due to continuing technological advances, a size of electronic components (e.g., semiconductor integrated circuits) has been continuing to decrease at a tremendous rate. Many of these electronic components need a clock, and in order for the components to keep shrinking in size and still include a clock, a clock size must be able to shrink at least commensurately with other devices of the component.

One clock approach is to use a crystal (e.g., quartz) resonator as a precise frequency standard. Quartz can advantageously provide parts-per-million frequency stability (and, when calibrated, accuracy). Quartz is also advantageously very insensitive to temperature variations. Unfortunately, a quartz crystal resonator is a piezoelectric resonator, and the physics of piezoelectric resonators places limits on how much the resonator can actually be reduced in size.

That is, piezoelectric resonators rely upon a surface or body elastic wave that reflects off the sides of the element, and thus an overall size of the resonator is what determines the resonant frequency. For solids, elastic waves travel at about 10 Km/sec. Thus, if one needs a ~1 MHz resonator, one must use a device of ~0.1 cm typical dimension. Increasing the resonance frequency to further shrink the size of the resonator is not practical due to rapidly increasing acoustic losses in the bulk material. Hence, crystal resonators are not viable candidates for the degree of clock shrinkage required for continued electronic component miniaturization.

Another clock approach is to use micro-electro mechanical systems (MEMS) oscillators. However, MENS oscillators disadvantageously offer poor aging, shock, and temperature stability.

What are needed are further clock arrangements offering further degrees of miniaturization, while also providing high accuracy, and temperature, aging and shock stability.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims.

The following represents brief descriptions of the drawings, wherein.

DETAILED DESCRIPTION

Figure 1:
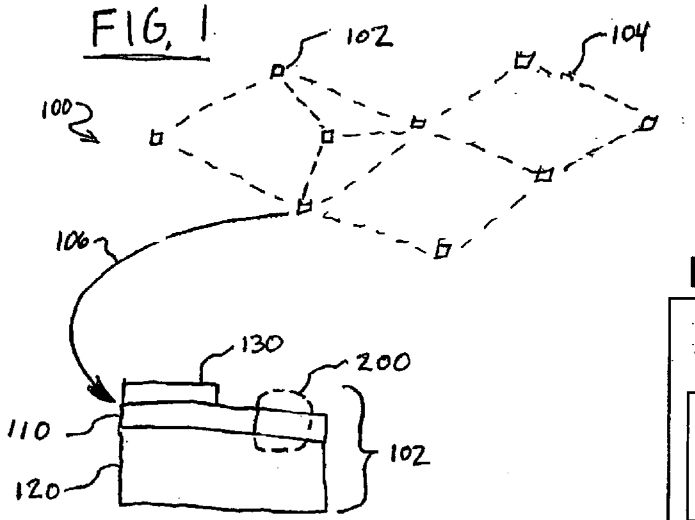
FIG. 1 is an example representative view of a mote system including a plurality of scattered electronic motes, with such arrangement being useful in gaining a more thorough understanding/appreciation of one example implementation of the present invention.

Before beginning a detailed description of the subject invention, mention of the following is in order. When appropriate, like reference numerals and characters may be used to designate identical, corresponding or similar components in differing figure drawings. Example arbitrary axes (e.g., X-axis, Y-axis and/or Z-axis) may be discussed/illustrated, although practice of embodiments of the present invention is not limited thereto (e.g., differing axes directions may be able to be assigned). Well known power/ground connections to ICs and other components may not be shown within the FIGS. for simplicity of illustration and discussion, and so as not to obscure the invention. Further, arrangements may be shown in block diagram form in order to avoid obscuring the invention, and also in view of the fact that specifics with respect to implementation of such block diagram arrangements are highly dependent upon the platform within which the present invention is to be implemented, i.e., such specifics should be well within purview of one skilled in the art. Where specific details (e.g., constructions, circuits) are-set forth in order to describe example embodiments of the invention, it should be apparent to one skilled in the art that the invention can be practiced without, or with variation of, these specific details. Finally, it should be apparent that differing combinations of hard-wired circuitry and software instructions can be used to implement embodiments of the present invention, i.e., the present invention is not limited to any specific combination of hardware and software.

Although example embodiments of the present invention will be described using an example implementation involving electronic components called "motes", practice of the invention is not limited thereto, i.e., the invention may be able to be practiced with many other types of devices (e.g., processor clocks) and/or types of systems (e.g., watches, personal computers, cell phones, personal digital assistants (PDAs), etc.).

Turning now to detailed discussion, intelligent sensor nodes are becoming of interest as viable future computing elements. One example of such sensor nodes is miniature computing nodes coined "motes" due to their minute size. (Webster's New World Dictionary, copyright 1988, page 884, defines a "mote" as "a speck of dust or other tiny particle.") That is, discussions to follow will be given using example embodiments of speck or dust sized integrated circuits (ICs) or "motes" which also include example clocks of the present invention.

More particularly, FIG. 1 shows a representative view of a mote system 100 including a plurality of scattered electronic motes 102 capable of sensing some type of predetermined parameter (e.g., temperature, motion, gaseous content), and capable of autonomously establishing communication (uni-directional or bi-directional) links 104 with one another so as to establish an overall mote network/system.

FIG. 1 further shows (via zoom arrow 106), enlargement of a simplistic example mote 102. More particularly, as a non-limiting example, the mote may have at least one semiconductor die or chip 110, stacked onto a power source 120 (e.g., battery, photocell, etc.) The mote may further have any one or ones of an unlimited number of accessories 130 (e.g., sensors, transmitter, receiver, memory, lasers, photodetector, capacitor, etc.). The die 110 may further have a clock area 200 (discussed in greater detail ahead).

In short, huge numbers of inexpensive, truly dust-scale, wireless modules may be produced and deployed (e.g., strategically placed and/or simply randomly scattered) for a wide variety of missions (e.g., sensing, temperature monitoring, military applications, etc.). By means of proactive software and ad hoc networking services, an entire sensing network can be set up and used in this way, with little human intervention.

A surprising discovery from these ever-smaller motes is that clocks, which provide the mote with a stable time base, have been a limiting factor to scaling (i.e., continued size reduction). As mentioned previously, quartz crystal resonators and MEMS oscillators are disadvantageous in terms of one or more of scaling, aging, shock and/or temperature limitations/instabilities. Thus, such technologies are not suitable to achieve continued miniaturization of clocks to a size required to achieve continued miniaturization of the example motes (or of many other types of ICs).

Before discussion turns to example embodiments of advantageous miniaturizable clocks of the present invention, discussion first turns to some example desirable criteria for clocks. More particularly, with respect to motes (as well as with other electronic arrangements), it is desirable to have a clock time-base with parts-per-million (ppm) stability for the many reasons. For example, in communications, systems may rely upon precise carrier frequencies, or upon precise time-slots for packet transmissions. For power management, precise knowledge of the time of day may permit scheduled down time to preserve battery life while possessing a high level of activity at critical event times. Sensors often rely implicitly upon a precise time-base to make accurate measurements (e.g., ADC's). Even within a system (i.e., intra-system), many subsystems need accurate time coordination for efficient data exchanges, e.g., CPU to RAM busses. As ad hoc networks of sensors are built, universal time may become an important architecture element.

Given the above criteria, research has been made for new clock mechanisms/technologies that are suitable for Si scaling, and that have intrinsic high quality as frequency standards. The mechanism/technology discussed herein for clocks of the present invention is nuclear spin resonance. That is, the use of nuclear magnetic resonance (NMR) as a physical basis of a clock standard having high precision.

Nuclear spins are advantageous in that they are decoupled from many of the physical degrees of freedom inside a typical solid. As a result, nuclear spin dynamics are insensitive to shock, vibration, lattice temperature, defects, crystal structure, etc. As a disadvantage, nuclear spins strongly interact with externally applied electromagnetic fields such as DC magnetic fields and RF signals.

Figure 2:
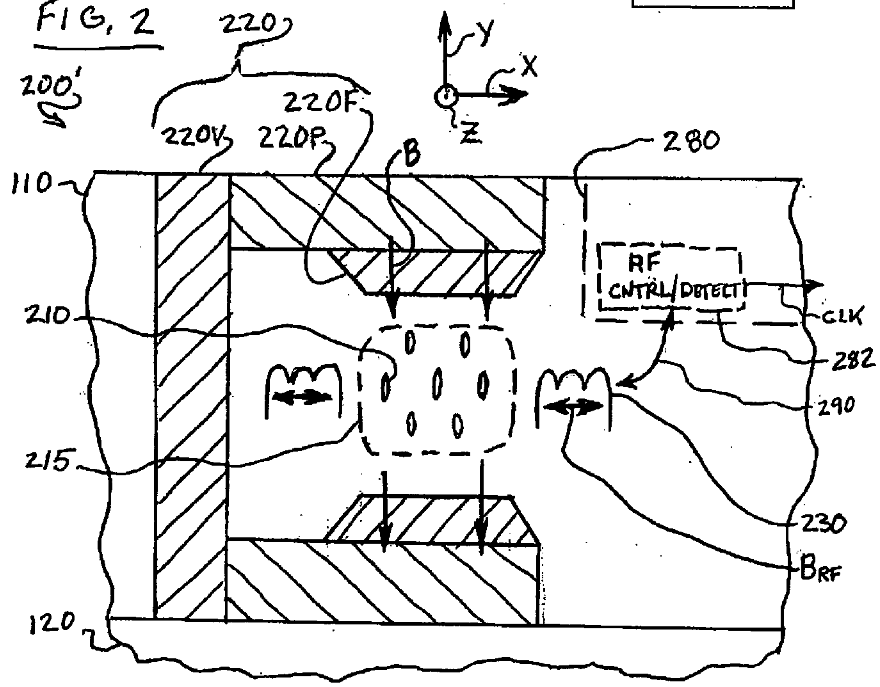
FIG. 2 shows an example enlarged partial cross-sectional view of an example clock area of one of the FIG. 1 example motes, such view being useful in gaining a more thorough understanding/appreciation of one example embodiment of the present invention.

With the above in mind, example (non-limiting) NSR clock unit implementations within the clock area 200 (FIG. 1) will now be discussed. More particularly, FIG. 2 shows an example enlarged partial cross-sectional view 200' of the clock area. Shown again (in partial cut-away), are the die 110 and the power source 120 (the accessories 130 are not of consequence to the present invention, and thus are omitted from FIG. 2 (and other ones of the FIGS.) for clarity/brevity).

One example embodiment of an NSR clock may utilize a NSR (or NMR) "sample volume", and an example of the same is shown representatively as FIG. 2's enclosed volume 215. More particularly, NSR atoms 210 may be implanted (via any known method) at a desirable concentration within the die 110 so as to achieve the volume 215.

As one example volume, in an ideal case, nuclear spins of a given isotope are distributed with significant inter-nuclear spacing inside a solid matrix having nuclear spin =0 isotopes. A good example would be pure hydrogen, H1, implanted inside Si-28. That is, Si-28, as one example suitable material, has been found to have 0 nuclear spin, and as a result, the Si-28 atoms would not have any spins which would influence/interact with (i.e., disadvantageously affect) any implanted NSR atoms. Accordingly, Si-28 is advantageous as a supportive substrate for the implanted NSR atoms 210 in a clock of the present invention. However, practice of the present invention is not limited to Si-28.

In addition to a 0 spin substrate, a dilute mixture of nuclear spins may minimize spin—spin coupling which may lead to absorption line broadening. Accordingly, although practice of the present invention is not limited thereto, discussions below will be made using an example NSR clock unit having a dilute mixture (i.e., implantation) of H1 inside a Si-28 volume.

As to actual construction, the die 110 may be entirely formed of Si-28, or alternatively, Si-28 may be provided in a more limited way to establish a desired volume 215 of the NSR clock unit through any known method, e.g., via etching of a trench and then deposition of a volume of Si-28 therein. Once a sufficient volume of Si-28 material is provided, the hydrogen atoms are implanted (using any known method) to form the NSR sample volume 215 of the desired concentration at a desired location inside the Si-28. The desirable concentration depends upon materials used, and determination thereof is well within the purview of those skilled in the art.

As mentioned previously, nuclear spins strongly interact with any externally applied electromagnetic fields. Accordingly, in order to shield the NSR clock from influences of external electromagnetic fields, a strong DC magnetic field may be purposefully provided across the dilute nuclear spin sample with very good control over the field gradient, e.g., to effect a uniform DC magnetic field B (FIG. 2) extending through the sample volume 215. There are many ways in which a uniform DC magnetic field B may be supplied.

One example embodiment would be to provide permanent magnetic material closely neighboring one or both opposing sides of the sample volume 215. In the FIG. 2 example, such is shown as focusing permanent magnetic material 220F provided on both opposing sides of the volume. The magnetic material 220F components may be easily formed using etching and then deposition of a desired magnetic material (e.g., Fe; discussed ahead) within an etched void.

To further enhance a uniformity/strength of the DC magnetic field B, as well as to help control other magnetic flux portions emitted from the magnetic material 220F from affecting other neighboring circuits within the die 110, accessory 130 and/or power source 120, a magnetic loop path may be provided to contain/guide the flux. As one example, a flux path material 220P (FIG. 2) and flux via material 220V may form a magnetic loop path as shown.

It should be understood, however, in viewing the FIG. 2 example loop path, that the loop path is shown cross-sectional extending in two directions (X and Y) only on a left side of the sample volume 215 for sake of simplicity/brevity. In practice, plural magnetic loop paths may be included extending in multiple directions/sides, and may even extend contiguously around the sample volume 215 (i.e., around any of the FIG. 2X-, Y- and Z-axes) to partially and even fully enclose the sample volume 215. As one example, the magnetic components 220P, 220V may also be provided on a right-side of the FIG. 2 sample volume 215 in addition to the illustrated left-side. As another example, the magnetic component 220V may be of a cylinder-like shape extending around the sample volume 215 as rotated around FIG. 2's Y-axis, and upper and lower magnetic components 220P may represent lid-like shapes substantially sealing ends of the cylinder-like shape. A more fully enclosed sample volume 215 may advantageously have greater protection from stray external magnetic fields than would a less fully enclosed sample volume, and thus may represent a clock having greater stability.

The flux path material 220P be formed in a manner similar to the material 220F, i.e., by etching a void and then filling the void (e.g., via deposition) with a desired flux-guiding material. The flux path material 220P be formed by etching a via (e.g., square via) through the die 110 and then deposition of a desired flux-guiding material to fill the via. Such example arrangements may provide a strong flux-guiding magnetic path as well as a strong uniform (homogeneous) DC magnetic field B extending through all areas of the sample volume 215.

A uniform DC magnetic field B is advantageous in that it may insure that each nuclear spin within the volume 215 sees the same magnetic field. In the case of H1, the following NMR resonance equation may be applicable:

$$v(MHz)=4.258B_o(\text{kilogauss})$$

Thus, if each hydrogen nucleus within the sample volume 215 experiences the same externally applied magnetic field, all will resonate with applied RF fields at exactly the same frequency. To see the value of having substantial inter-proton spacing, it has been estimated that at a 2 Å spacing between protons, a spin—spin perturbation will cause a line width of ~9 KHz. Increasing the inter-proton spacing decreases this line width as a function of spacing[3].

In one example embodiment concerning specific material, layers of ferromagnetic material, such as Fe, may be used as the permanent magnetic material for the components 220F, 220P, 220V to create the flux path and DC magnetic field. Fe has a saturation magnetization of 1707 gauss (room temperature). Thus, Fe could induce an NMR resonance frequency of ~7.3 MHz, a useful clock frequency. A ferromagnetic substance may be advantageous in that it avoids extraneous noise modulation of the DC magnetic field that a current in a coil might produce.

To further complete the NSR clock and observe NMR resonance of the atoms within the sample volume 215, a weak radio frequency $B_{RF}$ magnetic field ("RF" meaning radio frequency) may be applied perpendicularly to the applied DC magnetic field, again through the sample volume 215. Such can be accomplished through any know means, e.g., by formation/operation of tiny RF antennas or coils (show representatively within FIG. 2 by items 230) within the die 110.

Operation of the coils 230 may be controlled/monitored by clock electronics 280, and more specifically by an RF CNTRL/DETECT 282 (i.e., controller/detector) unit forming part of the clock electronics 280. The clock electronics 280 may be formed, for example, within the die 110 at least partially within or near the clock area 220, or may even be provided remotely or off-die. The exact details of suitable RF CNTRL/DETECT 282 and other clock electronics 280 circuitry supportive of the NSR clock are dependent upon the platform in which the clock is implemented, and is also within the purview of those skilled in the art.

When applied, the weak $B_{RF}$ magnetic field causes spin precession and eventual spin flipping with the absorption of an RF photon. The frequency of the spin flipping/absorption may be monitored/detected (shown representatively by FIG. 2's double-headed arrow 290) by the clock electronics 280, and such detected frequency is useable for formation and outputting of an NSR clock frequency (shown representatively by FIG. 2's CLK arrow) for use by other parts of the device/system.

While the FIG. 2 NSR clock arrangement is advantageous in terms of size and scaling, such arrangement may be disadvantageous in that saturation magnetization of the 220F, 220P, 220V components may be a weak function of temperature. More particularly, as mentioned previously, nuclear spins strongly interact with externally applied electromagnetic fields, and any magnetic field B change may resultingly affect NSR clock frequency. Stated differently, temperature changes will cause small changes in magnetic strength output by the magnetic components 220F, 220P, 220V and thus in the applied DC magnetic field B applied through the sample volume 215, and the field B changes will cause small changes in the NMR resonance frequency. In the FIG. 2 example embodiment, clock stability may disadvantageously stray as the saturation magnetization of FIG. 2's magnetic components 220F, 220P, 220V strays due to temperature change of the clock area 200. Such level of instability which may be unacceptable for some applications.

Accordingly, it would be advantageous to be able to achieve a NSR clock having improved stability. In order to achieve clock stability, any number of special arrangements may be made, examples of which will now be discussed.

One special arrangement may be to attempt to utilize specialized temperature-insensitive (i.e., thermally-stable) materials to construct ones or all of FIG. 2's magnetic components 220F, 220P or 220V, to minimize and/or prevent magnetic field change altogether. More particularly, as one example, in the publication "Temperature-compensated 2:17-type permanent magnets with improved magnetic properties", S. Liu, A. E. Ray, and H. F. Mildrum, *Journal of Applied Physics*, Vol 67(9) pp. 4975–4977. May 1, 1990, it was disclosed that a composition $Sm_{0.54}Gd_{0.46}(Co_{0.63}Fe_{0.29}Cu_{0.06}Zr_{0.02})_{7.69}$ exhibits a nearly zero temperature coefficient of magnetization from −60 to 150° C. Other temperature-insensitive magnetic materials may also be available. If such temperature-insensitive materials are able to be deposited/arranged in or on the substrate 110 in an arrangement to effect temperature-insensitive magnetic components and thus a temperature-insensitive uniform DC magnetic field B (FIG. 2) extending through the sample volume 215, a result may be a temperature insensitive NSR clock.

There may be a need for other special arrangements to compensate for (rather than prevent) magnetic field change. For example, specialized temperature-insensitive magnetic materials may be too difficult and/or cost prohibitive for use in some implementations, whereupon more temperature-sensitive magnetic materials would have to be used.

As another example, it is noted that even if specialized temperature-insensitive magnetic materials are used, less than perfect magnetic change prevention/minimization may still be encountered. For example, while thermal changes may not affect a magnetic field output from the magnetic components 220F, 220P or 220V, the thermal changes may still cause physical expansions/contractions within the NSR clock construction, which themselves may affect physical spacing of the magnetic components 220F, 220P or 220V with respect to the sample volume 215. Change in spacings may in turn affect a magnetic field B (FIG. 2) strength extending through the sample volume 215.

Accordingly, discussion turns now to non-limiting, non-exhaustive ones of other example compensating arrangements.

Figure 3:
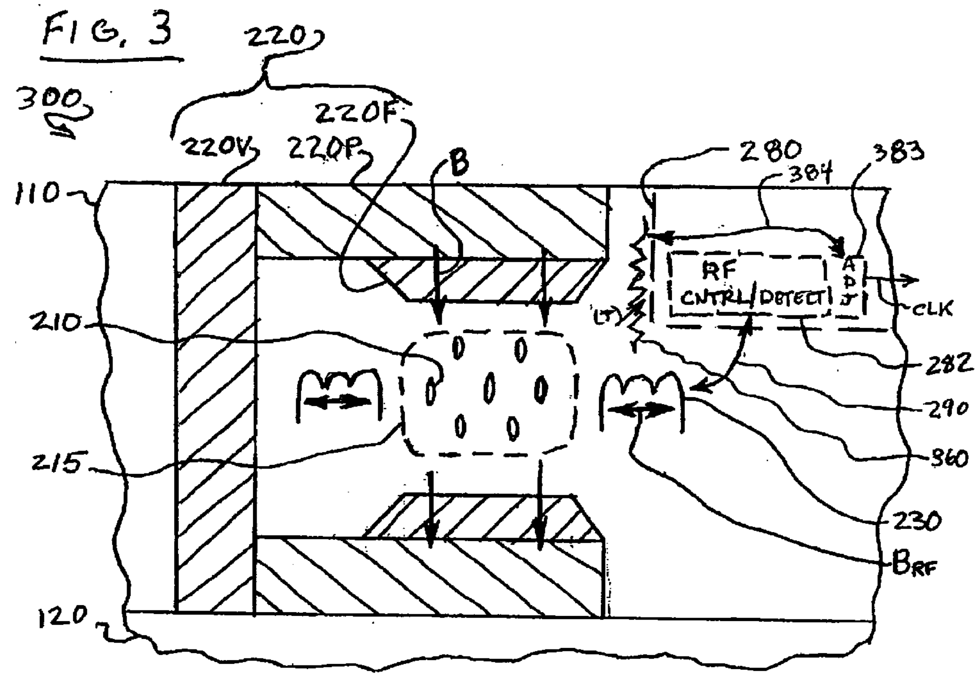
FIGS. 3–6 are example enlarged partial cross-sectional views similar to that of FIG. 2, but such views provide understanding appreciation of improvements with respect to further example of the present invention; and, FIG. 7 illustrates alternative example electronic system arrangements incorporating implementations of the present invention.

FIG. 3 shows an example embodiment 300 of another example compensating arrangement. More particularly, a small variable resistance thermometer 360 (e.g., thermistor) may be placed within the die or more particularly the clock area 200 (e.g., adjacent to the ferromagnetic material) to monitor a real-time ambient temperature of the clock environment. As an aid to understanding, a "(T)" designation placed adjacent to FIG. 3's thermoresistive element 360 is indicative that a resistance of such component 360 is variable with variation of temperature.

Any change in temperature may thus be sensed by a change in resistance, read out (shown representatively by FIG. 3's double-headed arrow 384) and used by adjustment (e.g., digital) circuitry 383, to adjust the digital frequency to compensate for temperature-induced change. One example would be to adjust frequency in a rational-ratio PLL locked to the NMR signal. Such may result in a highly stable clock with constant frequency and precise phase control. The exact arrangement of the thermometer 360 and its placement relative to the magnetic material, as well as the exact details of suitable adjustment circuitry 383, again are dependent upon the platform in which the clock is implemented, and are also within the purview of those skilled in the art.

Figure 4:
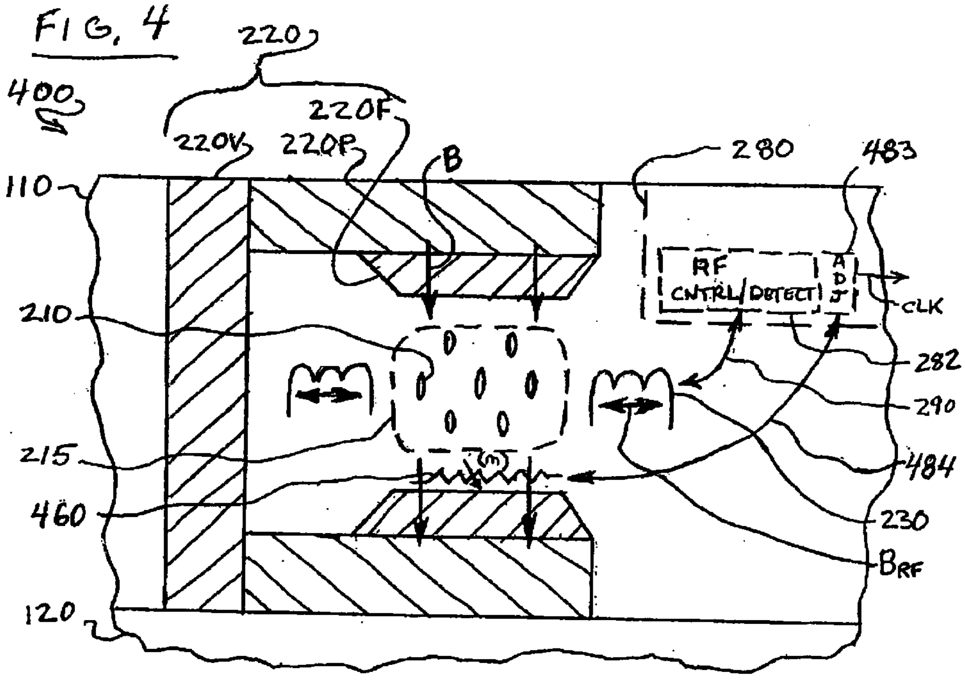

Another example embodiment 400 (FIG. 4) may include a small variable magnetoresistive component 460 placed, for example, adjacent to the volume 215 to monitor a real-time strength of a magnetic field B being applied across the volume 215. Again as an aid to understanding, a "(M)" designation placed adjacent magnetoresistive component 460 is indicative that a resistance of such component 460 is variable with variation of magnetic field. Magnetoresistive materials and components are well known and highly used within magnetic head technology of the hard disk drive art.

Any change in magnetic field strength may thus be sensed by the magnetoresistive element 460, read out (shown representatively by FIG. 4's double-headed arrow 484) and used by adjustment (e.g., digital) circuitry 483, to adjust the digital frequency in, for example, a rational-ratio PLL locked to the NMR signal. Such may result in a highly stable clock with constant frequency and precise phase control. The exact arrangement of the magnetoresistive element 460 and its placement relative to the magnetic field B, as well as the exact details of suitable adjustment circuitry 483, again are dependent upon the platform in which the clock is implemented, and are also within the purview of those skilled in the art.

Figure 5:
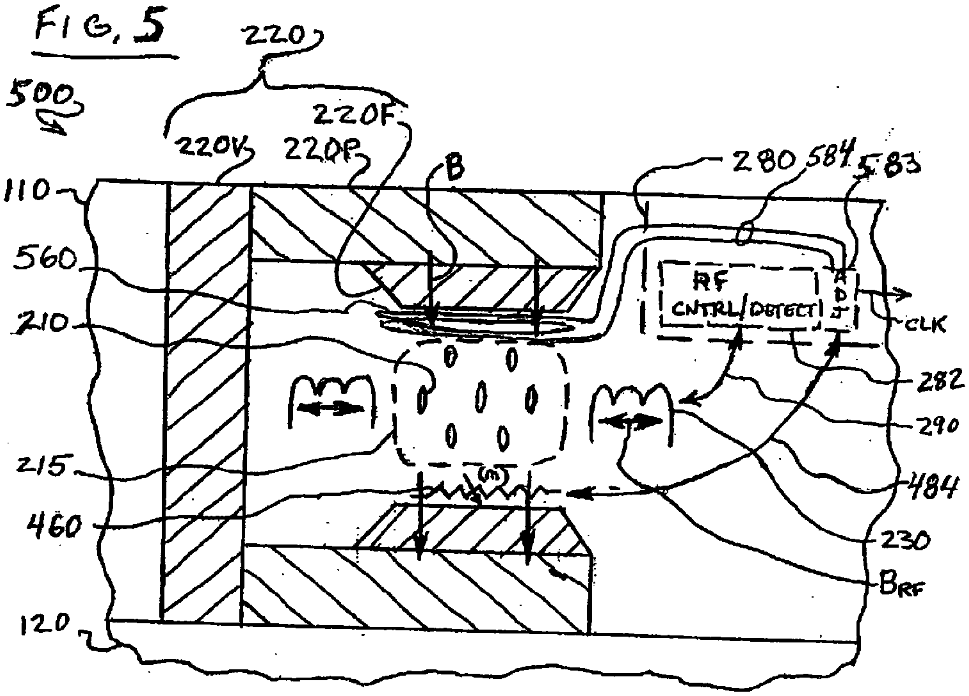

FIG. 5 shows another example embodiment 500 involving at least one coil 560 to dynamically add/subtract magnetic flux in an attempt to maintain magnetic field B strength substantially constant. The FIG. 5 example embodiment is similar to FIG. 4, with the following further changes. More particularly, provided are adjustment circuitry 583 (forming part of the clock electronics 280) and lines 584.

The coil 560 may be disposed, for example, between the sample volume 215 and the magnetic material 220P, on one or both opposing sides of the sample volume 215. Another arrangement would be for one or more coil to wrap around any ones of the magnetic components 220F, 220P, 220V, or may be provided externally to the die 110. Only one coil is shown/described with respect to the FIG. 5 example embodiment, for purposes of clarity/simplicity/brevity.

Whatever the placement, the coil(s) 560 may be controlled by lines 584 coming from adjustment circuitry 583, and arranged such that magnetic flux emanated from the coil can add or subtract magnetic flux to the magnetic circuit to afford a mechanism of control in an attempt to maintain the magnetic field B substantially constant. The coil(s) 560 may be formed through any known or subsequently discovered approach, and as one example, may be formed by etching/filling an arrangement of a series of trenches, vias, etc. to form an interconnected coil-like shape.

Operation of the coil(s) 560 may be controlled by clock electronics 280, and more specifically by adjustment circuitry 583 forming part of the clock electronics 280. Turning now to further discussion, any change in magnetic field B strength may be sensed using the magnetoresistive component 460, read out (shown representatively by FIG. 5's double-headed arrow 484) and used by adjustment (e.g., digital) circuitry 583, to then apply suitable positive or negative current as a feedback control to the coil(s) 560, to add or subtract magnetic flux to the magnetic circuit to attempt to maintain the magnetic field B applied across the sample volume 215 substantially constant. Such may result in a highly stable clock with constant frequency and precise phase control.

Again, the clock electronics 280 may be formed, for example, within the die 110 at least partially within or near the clock area 220, or may even be provided off-die. The exact details of suitable adjustment circuitry 583 and other clock electronics 280 circuitry are dependent upon the platform in which the clock is implemented, and is also within the purview of those skilled in the art.

As one note concerning the FIG. 5 example embodiment, care should be taken to insure that spurious changes in coil(s) 560 flux do not disturb stable NSR clock output. For example, the clock electronics 280 may be designed to ignore spurious changes in spin flipping/absorption read-out 290, and/or ignore spurious changes in magnetoresistive read-out 484, for a predetermined time period associated with a spurious change in coil(s) 560 flux.

Figure 6:
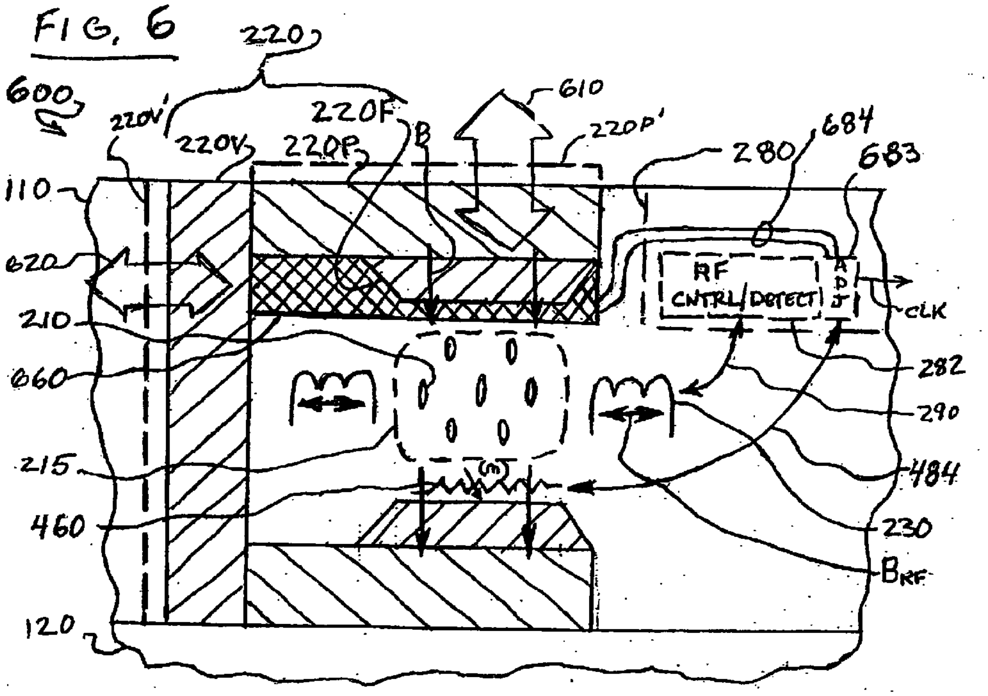

FIG. 6 shows yet another example compensating embodiment, this time involving physical displacement/adjustment of a positioning of one or more of the magnetic components 220F, 220P, 220V to adjust a magnetic circuit reluctance and/or magnetic component spacing (relative to the sample volume 215) in an attempt to maintain magnetic field B strength applied across the sample volume 215 substantially constant. The FIG. 6 example embodiment is similar to FIG. 4, with the following changes. More particularly, provided are adjustment circuitry 683 (forming part of the clock electronics 280) and lines 684.

Further, such example embodiment may include some type of actuator arrangement (show only representatively in FIG. 6 by the cross-hatched block 660) for physical displacement/adjustment (shown representatively by double-headed arrow movements 610, 620 and dashed-line displacements 220V' and 220P') of a positioning of one or more of, or any part of, the magnetic components 220F, 220P, 220V. Only one actuator is shown/described with respect to the FIG. 6 example embodiment, for purposes of clarity/simplicity/brevity.

Again, one goal of such actuator arrangement is to adjust magnetic circuit reluctance and/or magnetic component spacing (relative to the sample volume 215), in an attempt to maintain magnetic field B strength applied across the sample volume 215 substantially constant. Actuation can be done in any number of different ways. Non-limiting examples are discussed as below.

As a first example, the actuator 660 may be a piezoelectric device (e.g., piezoelectric crystal) connectable to lines 684 coming from adjustment circuitry 683, and arranged such that actuation supplied by the device changes reluctance and/or spacing of the magnetic circuit, to attempt to maintain the magnetic field B applied across the sample volume 215 substantially constant. The piezoelectric device may be formed through any known or subsequently discovered approach, and as one example, may be formed by etching/deposition of appropriate piezoelectric crystals and/or layers.

Operation (i.e., degree of actuation) of the piezoelectric device may be controlled by clock electronics 280, and more specifically by adjustment circuitry 683 forming part of the clock electronics 280. More particularly, as one example, any change in magnetic field B strength may be sensed using the magnetoresistive component 460, read out (shown representatively by FIG. 6's double-headed arrow 484) and used by adjustment (e.g., digital) circuitry 683, to then apply suitable biasing (e.g., biasing voltage) as a feedback control to the piezoelectric device 660 to effect change in reluctance and/or spacing of the magnetic circuit to attempt to maintain the magnetic field B applied across the sample volume 215 substantially constant. Such may result in a highly stable clock with constant frequency and precise phase control.

Again, the clock electronics 280 may be formed, for example, within the die 110 at least partially within or near the clock area 220, or may even be provided off-die. The exact details of suitable adjustment circuitry 683 and other clock electronics 280 circuitry are dependent upon the platform in which the clock is implemented, and is also within the purview of those skilled in the art.

Beyond a piezoelectric device, another example might be a miniaturized motor which is controllable to effect actuation. Still another example might be a temperature-sensitive shape- and/or volume-change material as the actuator 660 to effect movement 610 or 620. That is, the shape- and/or volume-change material may be carefully selected such that any actuation movement provided as a result of temperature change, to provide a change in reluctance and/or spacing of the magnetic circuit so as to at least partially offset any change in DC magnetic field strength supplied by the permanent magnetic material. Such embodiment may be advantageous in that the adjustment circuitry 683 and control lines 684 would not be needed.

As a note concerning the FIG. 6 example embodiment, care should be taken to insure that spurious changes in resultant from actuation flux do not disturb stable NSR clock output. For example, the clock electronics 280 may be designed to ignore spurious changes in spin flipping/absorption read-out 290, and/or ignore spurious changes in magnetoresistive read-out 484, for a predetermined time period associated with a spurious change in actuation caused by control of the actuator 660.

Figure 7:
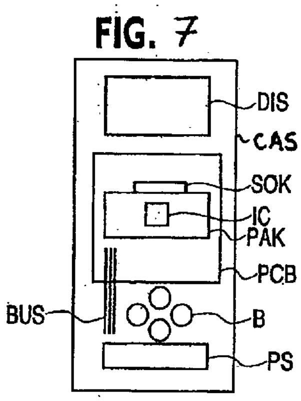

FIG. 7 illustrates example electronic system arrangements that may incorporate implementations of the present invention. More particularly, shown is an integrated circuit (IC) chip that may incorporate one or more implementations of the present clock invention as an IC chip system. Such IC may be part of an electronic package PAK incorporating the IC together with supportive components onto a substrate such as a printed circuit board (PCB) as a packaged system. The packaged system may be mounted, for example, via a socket SOK onto a system board (e.g., a motherboard system (MB)). The system board may be part of an overall electronic device (e.g., computer, electronic consumer device, server, communication equipment) system that may also include one or more of the following items: input (e.g., user) buttons B, an output (e.g., display DIS), a bus or bus portion BUS, a power supply arrangement PS, and a case CAS (e.g., plastic or metal chassis).

In beginning to conclude, it should be recognized from the above that the entire NMR clock could be made on a scale of microns, or smaller. The only constraints may be field uniformity and minimization of nuclear spin disturbances.

The following represents a rough summary of advantageous elements of the solution. More particularly, first, a matrix of atoms in solid form with zero nuclear spin. Second, a distribution of non-zero nuclear spin isotopes inside the matrix with suitable inter-spin spacing. Third, an externally applied DC magnetic field of high intensity and good uniformity. Fourth, a perpendicularly applied RF magnetic field to induce spin flipping on resonance. Next, an electronic circuit to lock a digital clock to the NMR resonance. Finally, either temperature control, specialized temperature-insensitive magnetic materials, or compensation to minimize or correct for temperature induced changes in the DC magnetic field.

Useful alternatives would be NMR on a liquid or gas phase volume. Use of current in coils to produce substantially all of the DC magnetic field. Use of spin-polarized AC currents to form the tickler field as a substitute for wires or coils of wires.

At least a portion of the present invention may be practiced as a software invention, implemented in the form of one or more machine-readable medium having stored thereon at least one sequence of instructions that, when executed, causes a machine to effect operations with respect to NSR clock implementations of the invention. For example, control operations of the NSR clock.

As closing caveats, reference in the specification to "one embodiment", "an embodiment", "example embodiment", etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment or component, it is submitted that it is within the purview of one skilled in the art to effect such feature, structure, or characteristic in connection with other ones of the embodiments and/or components. Furthermore, for ease of understanding, certain method procedures may have been delineated as separate procedures; however, these separately delineated procedures should not be construed as necessarily order dependent in their performance, i.e., some procedures may be able to be performed in an alternative ordering, simultaneously, etc.

This concludes the description of the example embodiments. Although the present invention has been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the components parts and/or arrangements, alternative uses will also be apparent to those skilled in the art.

What is claimed is:

1. A nuclear spin resonance (NSR) clock unit comprising:

a NSR clock provided within a semiconductor substrate; and a NSR clock stabilizer to stabilize a NSR clock output against thermal influences, by at least one of:

at least one magnetic circuit component at least partially formed of a composition having a nearly zero temperature coefficient of magnetization for a predetermined temperature range;

a thermal magnetic field compensator to keep a static magnetic field strength applied to a nuclear spin area of the NSR clock substantially constant during thermal variations; and a frequency corrector to correct output clock frequency relative to thermal variations.

2. A NSR clock unit as claimed in claim 1, wherein the frequency corrector applies a correction factor related to a degree of thermal variation.

3. A NSR clock unit as claimed in claim 1, having hydrogen atoms implanted within the semiconductor substrate for NSR atoms of the NSR clock.

4. A NSR clock unit as claimed in claim 1, wherein at least a portion of the semiconductor substrate having the NSR clock is substantially made of Si-28.

5. A NSR clock unit as claimed in claim 1, comprising at least one of a thermoresistive and a magnetoresistive element to measure thermal variation.

6. A NSR clock unit as claimed in claim 1, wherein the thermal magnetic field compensator physically moves at least one of a static magnet portion and a magnetic flux path component relative to the NSR clock during thermal variations, to keep the static magnetic field strength applied to a nuclear spin area of the NSR clock substantially constant during thermal variations.

7. A NSR clock unit as claimed in claim 1, wherein the thermal magnetic field compensator applies an adjustable compensating magnetic field to keep the static magnetic field strength applied to a nuclear spin area of the NSR clock substantially constant during thermal variations.

8. A NSR clock unit as claimed in claim 7, comprising at least one of a thermoresistive and magnetoresistive element, an output of which is used to determine a level of the compensating magnetic field.

9. An integrated circuit (IC) comprising:

a semiconductor substrate;

at least one non-clock circuit; and a nuclear spin resonance (NSR) clock unit having:

a NSR clock provided within the semiconductor substrate; and a NSR clock stabilizer to stabilize a NSR clock output against thermal influences, by at least one of:

at least one static magnetic circuit component at least partially formed of a composition having a nearly zero temperature coefficient of magnetization for a predetermined temperature range;

a thermal magnetic field compensator to keep a static magnetic field strength applied to a nuclear spin area of the NSR clock substantially constant during thermal variations; and a frequency corrector to correct output clock frequency relative to thermal variations.

10. An IC as claimed in claim 9, wherein the frequency corrector applies a correction factor related to a degree of thermal variation.

11. An IC as claimed in claim 9, having hydrogen atoms implanted within the semiconductor substrate for NSR atoms of the NSR clock.

12. An IC as claimed in claim 9, wherein at least a portion of the semiconductor substrate having the NSR clock is substantially made of Si-28.

13. An IC as claimed in claim 9, comprising at least one of a thermoresistive and a magnetoresistive element to measure thermal variation.

14. An IC as claimed in claim 9, wherein the thermal magnetic field compensator physically moves at least one of a static magnet portion and a magnetic flux path component relative to the NSR clock during thermal variations, to keep the static magnetic field strength applied to a nuclear spin area of the NSR clock substantially constant during thermal variations.

15. An IC as claimed in claim 9, wherein the thermal magnetic field compensator applies an adjustable compensating magnetic field to keep the static magnetic field strength applied to a nuclear spin area of the NSR clock substantially constant during thermal variations.

16. An IC as claimed in claim 15, comprising at least one of a thermoresistive and magnetoresistive element, an output of which is used to determine a level of the compensating magnetic field.

17. An electronic system comprising:

at least one item selected from a list of: an electronic package, PCB, socket, bus portion, input device, output device, power supply arrangement and case; and a nuclear spin resonance (NSR) clock unit including:

a NSR clock provided within a semiconductor substrate; and a NSR clock stabilizer to stabilize a NSR clock output against thermal influences, by at least one of:

at least one magnetic circuit component at least partially formed of a composition having a nearly zero temperature coefficient of magnetization for a predetermined temperature range;

a thermal magnetic field compensator to keep a static magnetic field strength applied to a nuclear spin area of the NSR clock substantially constant during thermal variations; and a frequency corrector to correct output clock frequency relative to thermal variations.

18. An electronic system as claimed in claim 17, wherein the frequency corrector applies a correction factor related to a degree of thermal variation.

19. An electronic system as claimed in claim 17, having hydrogen atoms implanted within the semiconductor substrate for NSR atoms of the NSR clock.

20. An electronic system as claimed in claim 17, wherein at least a portion of the semiconductor substrate having the NSR clock is substantially made of Si-28.

21. An electronic system as claimed in claim 17, comprising at least one of a thermoresistive and a magnetoresistive element to measure thermal variation.

22. An electronic system as claimed in claim 17, wherein the thermal magnetic field compensator physically moves at least one of a static magnet portion and a magnetic flux path component relative to the NSR clock during thermal variations, to keep the static magnetic field strength applied to a nuclear spin area of the NSR clock substantially constant during thermal variations.

23. An electronic system as claimed in claim 17, wherein the thermal magnetic field compensator applies an adjustable compensating magnetic field to keep the static magnetic field strength applied to a nuclear spin area of the NSR clock substantially constant during thermal variations.

24. An electronic system as claimed in claim 23, comprising at least one of a thermoresistive and magnetoresistive element, an output of which is used to determine a level of the compensating magnetic field.

* * * * *